United States Patent Office 3,428,645
Patented Feb. 18, 1969

---

3,428,645
PHOSPHORUS ESTERS OF CERTAIN THIAZOLE DERIVATIVES
Carl C. Greco, Bronx, N.Y., assignor to Stauffer Chemical Company, New York, N.Y., a corporation of Delaware
No Drawing. Filed Oct. 23, 1965, Ser. No. 504,244
U.S. Cl. 260—306       3 Claims
Int. Cl. C07f 9/16

This invention relates to novel organophosphorus esters. More particularly, this invention is concerned with novel heterocyclic diphenylphosphinodithioates which are useful as light (ultra-violet) stabilizers for poly-alpha-olefin compositions.

It is known that plastic and polymeric materials generally undergo degradation in the presence of light and/or heat. Especially sensitive to these agencies are some of the synthetic resins such as polyethylene, polypropylene and the like. In order to increase the life of plastics and polymers, it has become the practice to incorporate therein certain substances, usually referred to as ultra-violet absorbers which are capable of absorbing the incident actinic radiation, thereby protecting the plastic substrate from deterioration.

We have now discovered that certain novel heterocyclic diphenylphosphinodithioates are effective in protecting poly-alpha-olefins against the deleterious effects of light, and the provision of such compounds constitutes the primary purpose and object of this invention.

Another object of the invention is to provide poly-alpha-olefin compositions stabilized with the above-named compounds.

Other objects will be apparent from the detailed description which follows.

The novel heterocyclic diphenylphosphinodithioates of the invention may be represented by the general formula

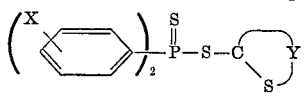

wherein X is a substituent selected from the group consisting of hydrogen, lower alkyl, lower alkoxy, and a halogen such as chlorine and bromine and the like, and Y represents the atoms necessary to complete a heterocyclic ring selected from the class consisting of thiazole, thiazoline, thiozolidine, and benzothiazole wherein each heterocyclic ring may be substituted with a substituent selected from the group consisting of lower alkyl, lower alkoxy, and a halogen such as chlorine or bromine and the like. The lower alkyl and alkoxy substituents may have from 1 to 10 carbon atoms.

The novel compounds of the invention are prepared by reacting a diphenylphosphinothioic chloride with a heterocyclic mercaptan in accordance with the following equation:

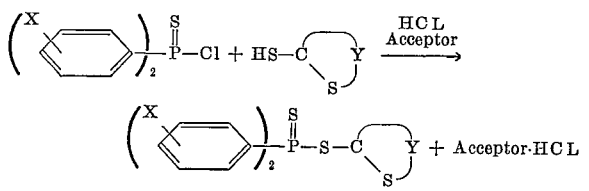

wherein X and Y are as previously defined.

In preparing the new organo phosphorus esters of the invention, I have discovered that generally excellent results are achieved by heating the diphenylphosphinothioic chloride with a heterocyclic mercaptan with or without a solvent and thereafter isolating the heterocyclic diphenylphosphinodithioate from the hydrochloric acid by-product. An especially convenient means for conducting the reaction is to reflux the components in the presence of a relatively inert organic solvent such as benzene, toluene or xylene. The use of a tertiary amine such as pyridine, alpha-picoline or quinoline to act as a hydrogen halide acceptor is also desirable. After removing the amine hydrochloride precipitate and distilling off the solvent under reduced pressure, the residual heterocyclic diphenylphosphinodithioate may be isolated by employing the usual techniques available to the skilled organic chemist such as crystallization, distillization, sublimation and the like.

The ultra-violet stabilizer compounds contemplated by the invention may be blended or incorporated into the poly-alpha-olefin compositions by any of the conventional methods commonly used for mixing such materials with resins and plastics. For example, milling on heated rolls, deposition from solvents and dry blending are applicable well-known techniques.

In order to prepare poly-alpha-olefin compositions which are resistant to prolonged exposure to sunlight and the elements, it is preferred that the concentration of the novel heterocyclic diphenylphosphinodithioate be maintained in the range of 0.01 to about 5.0% based on the weight of the polymer.

Although the molecular weight of poly-alpha-olefins varies over wide limits, the compounds of the invention are not restricted to any particular molecular weight range. Poly-alpha-olefins ranging in molecular weight from about 15,000 to about 20,000, however, are afforded particularly excellent protection.

The following examples which are illustrative of the invention should not be construed as limiting examples, for variations and modifications thereof will be apparent to one having ordinary skill in this art.

PREPARATION OF THE COMPOUNDS

Example 1.—2-thiazolinyl diphenylphosphinodithioate

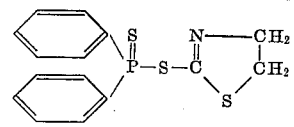

In a 250 cc. flask fitted with a stirrer, condenser, thermometer and dropping funnel was placed 9.5 grams (0.08 mol) of 2-mercapto-2-thiazoline, 10 cc. of pyridine and 125 cc. of benzene. The mixture was heated to 80° C. and 20 grams (0.08 mol) of diphenyl phosphinothioic chloride was added by way of the dropping funnel. The reaction mixture was refluxed for four hours and then allowed to stand at room temperature for one day. After removing the pyridine hydrochloride precipitate by filtration, the filtrate was distilled at reduced pressure to remove the solvent. The residual colorless solid was crystallized from benzene. Infrared spectrum analysis indicated the purified product to have the above depicted configuration.

Example 2.—2-benzothiazolyl diphenylphosphinodithioate

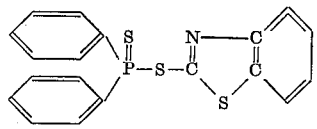

In a 250 cc. flask fitted with a stirrer, condenser, thermometer and dropping funnel was placed 5.6 grams (0.36 mol) of 2-mercaptobenzothiazolyl, 8 cc. pyridine and 125 cc. toluene. The mixture was heated to 95° C. and maintained at that temperature for five hours. After standing overnight, the pyridine hydrochloride precipitate was separated by filtration and the filtrate was distilled at reduced pressure to remove the solvent. The residual solid was crystallized from acetonitrile. Infrared spectrum analysis indicated the purified product to have the above depicted configuration.

Using the procedure of Examples 1 and 2, the following compounds may be prepared:

Example 3.—4-benzyl, 5-ethyl, 2-thiazolyl diphenylphosphinodithioate

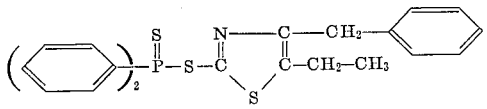

Example 4.—4,5-dimethyl, 2-thiazolidinyl bis(p-chlorophenyl)-phosphinodithioate

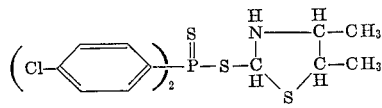

Example 5.—4,5-dichloro, 2-thiazolidinyl diphenylphosphinodithioate

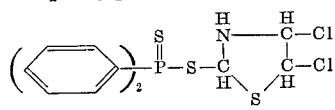

Example 6.—2-thiazolyl diphenylphosphinodithioate

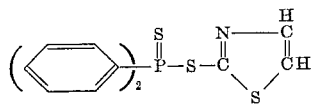

Example 7.—4-ethoxy, 5-chloro, 2-thiazolinyl bis(p-ethoxyphenyl) phosphinodithioate

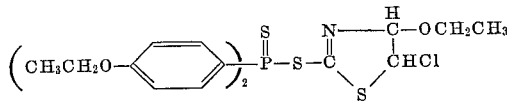

Example 8.—2-thiazolinyl bis(p-n-propyldiphenyl) phosphinodithioate

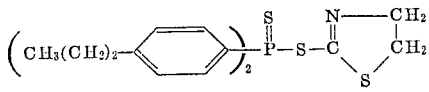

Dry blends consisting of 0.5% by weight of each of the compounds of Examples 1 and 2 and 50 grams of isotactic polypropylene were subjected to compression molding in the usual manner at a temperature of 400° F. for six minutes at 2000 p.s.i. The blended polymers were compression molded or extruded into 25 mil. sheets and thereafter cut into square samples measuring 2 inches on the side. A like sample containing no stabilizer was also prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 1050 hours, the test sheets of polypropylene showed no signs of brittleness when flexed at an angle of 180°. Nor was there any evidence at this time of any surface crazing or any coloration of staining. A blank specimen of unstabilized polypropylene which was exposed concurrently with the stabilized product failed the flexure test after 250 to 300 hours exposure time.

The weatherometer as used in compiling the data and tests described herein was purchased from the Atlas Electric Devices Company, Chicago, Ill. The instrument is identified as a 6000 Watt Xenon Arc Weatherometer Model 60W.

The polypropylene resin as used in the above-described example is an unstabilized general purpose, high molecular weight polypropylene of the isotactic or crystalline type. Typically, it has a melt index of 4 at 230° C. and a specific gravity of 0.905. The resin was purchased from the Hercules Powder Company under the trade name Profax and further identified as Number 6501, type P–02004 and is supplied in the form of natural flakes. We have also used other commercially available grades of unstabilized isotactic polypropylene resin, and in this connection mention is made of unstabilized Avisun polypropylene (Avisun Corp.) and unstabilized Shell polypropylene (Shell Chemical Co., Division of Shell Oil). The results obtained in using the various grades and types of polypropylene were in general agreement.

I claim:
1. A compound of the formula

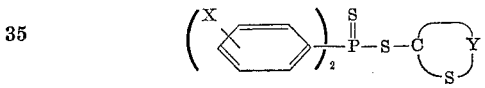

wherein X is a substituent selected from the group consisting of hydrogen, lower alkyl, lower alkoxy, and halogen; and Y represents the atoms necessary to complete a heterocyclic ring selected from the class consisting of 2-thiazolyl, 2-thiazolin-2-yl, 2-thiazolidinyl, and 2-benzothiazolyl wherein each ring may be substituted with one or more substituents selected from the group consisting of lower alkyl, lower alkoxy, benzyl and halogen.

2. 2-thiazolinyl diphenylphosphinodithioate.
3. 2-benzothiazolyl diphenylphosphinodithioate.

References Cited

UNITED STATES PATENTS

| 2,881,200 | 4/1959 | Craig et al. | 260—961 |
| 3,232,830 | 2/1966 | Schrader et al. | 260—302 |

ALTON D. ROLLINS, Primary Examiner.

U.S. Cl. X.R.

260—45.8, 302, 306.7